United States Patent [19]

Van Dijen

[11] Patent Number: 5,236,471
[45] Date of Patent: Aug. 17, 1993

[54] PROCESS FOR THE PRODUCTION OF SINTERED MATERIAL BASED ON α-ALUMINUM OXIDE, ESPECIALLY FOR ABRASIVES

[75] Inventor: Franciscus Van Dijen, Dettighofen, Fed. Rep. of Germany

[73] Assignee: Lonza Ltd., Gampel/Valias, Switzerland

[21] Appl. No.: 899,719

[22] Filed: Jun. 17, 1992

[30] Foreign Application Priority Data

Jun. 21, 1991 [CH] Switzerland .......................... 1844/91

[51] Int. Cl.$^5$ .............................................. B24D 3/00
[52] U.S. Cl. ........................................ 51/293; 51/309; 501/127
[58] Field of Search .................... 51/293, 309; 501/127

[56] References Cited

U.S. PATENT DOCUMENTS

| | | | |
|---|---|---|---|
| 2,015,658 | 10/1935 | Bezzenberger | 51/298 |
| 2,278,442 | 4/1942 | Heany | 51/308 |
| 3,734,965 | 5/1973 | Becker | 260/570.5 |
| 3,775,113 | 11/1973 | Bonham et al. | 430/257 |
| 3,781,172 | 12/1973 | Pett et al. | 51/309 |
| 3,817,976 | 6/1974 | Bakul et al. | 260/190 |
| 3,862,060 | 1/1975 | Anderson et al. | 260/7 |
| 3,887,450 | 6/1975 | Gilano et al. | 522/8 |
| 3,891,408 | 6/1975 | Rowse et al. | 51/309 |
| 3,893,826 | 7/1975 | Quinan et al. | 51/298 |
| 3,895,949 | 7/1975 | Akamatsu et al. | 522/115 |
| 3,933,936 | 1/1976 | Smith et al. | 260/841 |
| 4,047,903 | 9/1977 | Hesse et al. | 51/298 |
| 4,102,866 | 7/1978 | Speranza et al. | 528/135 |
| 4,108,840 | 8/1978 | Friedlander | 525/412 |
| 4,154,724 | 5/1979 | Schulze | 528/68 |
| 4,163,030 | 7/1979 | Banucci et al. | 525/429 |
| 4,165,520 | 8/1979 | Waddill et al. | 525/484 |
| 4,226,971 | 10/1980 | Waddill et al. | 528/162 |
| 4,284,758 | 8/1981 | North | 528/245 |
| 4,285,690 | 8/1981 | North | 528/245 |
| 4,311,631 | 1/1982 | Myers et al. | 523/143 |
| 4,314,827 | 2/1982 | Leitheiser et al. | 51/309 |
| 4,318,766 | 3/1982 | Smith | 522/25 |
| 4,332,586 | 6/1982 | North | 528/245 |
| 4,345,063 | 8/1982 | North | 528/249 |
| 4,505,712 | 3/1985 | Floyd et al. | 428/262 |
| 4,505,720 | 3/1985 | Gabor et al. | 51/309 |
| 4,515,835 | 5/1985 | Kuhn et al. | 525/162 |
| 4,518,397 | 5/1985 | Leitheiser et al. | 51/293 |
| 4,571,413 | 2/1986 | Dolden et al. | 524/199 |
| 4,574,003 | 3/1986 | Gerk | 51/309 |
| 4,588,418 | 5/1986 | Caul et al. | 48/197 R |
| 4,650,838 | 3/1987 | Das et al. | 525/504 |
| 4,652,274 | 3/1987 | Boettcher et al. | 51/298 |
| 4,735,632 | 4/1988 | Oxman et al. | 51/295 |
| 4,744,802 | 5/1988 | Schwabel | 51/309 |
| 4,748,043 | 5/1988 | Seaver et al. | 427/30 |
| 4,785,073 | 11/1988 | Farkas et al. | 528/163 |

(List continued on next page.)

FOREIGN PATENT DOCUMENTS

228856 9/1988 European Pat. Off. .
1501331 2/1978 United Kingdom .

OTHER PUBLICATIONS

"Water Compatible Phenolic Resins," *Proceedings of the American Chemical Society, Division of Polymeric Materials: Science and Engineering*, 65, pp. 275–276 (1991).
*The Handbook of Chemistry and Physics*, 58th Ed., pp. C-726–C-732, CRC Press, Inc., West Palm, Beach, Florida (1977).
Kirk-Othmer, *Encyclopedia of Chemical Technology*, 3rd ed., John Wiley & Sons, 1981, N.Y. vol. 17, p. 349 et. seq.

*Primary Examiner*—Mark L. Bell
*Assistant Examiner*—Willie J. Thompson
*Attorney, Agent, or Firm*—Fisher, Christen & Sabol

[57] ABSTRACT

A sintered material, especially usuable as an abrasive, based on α-aluminum oxide is produced from Al(OH)$_3$ or aluminum oxide calcined at a lower temperature. Aluminum hydroxide resulting in the Bayer process can be used as the Al(OH)$_3$. The sintered material is distinguished by a crystallite size of standard <0.5 μm, high density and great hardness.

19 Claims, No Drawings

U.S. PATENT DOCUMENTS

| | | | |
|---|---|---|---|
| 4,786,292 | 11/1988 | Janz et al. | 51/293 |
| 4,786,683 | 11/1988 | Schloman, Jr. et al. | 525/54.42 |
| 4,799,938 | 1/1989 | Janz et al. | 51/293 |
| 4,802,896 | 2/1989 | Law et al. | 51/298 |
| 4,881,951 | 11/1989 | Wood et al. | 51/309 |
| 4,903,440 | 2/1990 | Larson et al. | 51/298 |
| 4,904,516 | 2/1990 | Creamer | 528/129 |
| 4,906,774 | 3/1990 | Speranza et al. | 564/57 |
| 4,927,431 | 5/1990 | Buchanan et al. | 51/298 |
| 4,964,883 | 10/1990 | Morris et al. | 51/293 |
| 4,997,717 | 3/1991 | Rembold et al. | 428/413 |
| 5,008,336 | 4/1991 | Richey, Jr. et al. | 525/124 |
| 5,026,405 | 6/1991 | Guerro | 51/298 |
| 5,039,759 | 8/1991 | Hoy et al. | 525/437 |
| 5,041,481 | 8/1991 | Sugimori et al. | 524/188 |
| 5,076,815 | 12/1991 | Kunz et al.1 | 51/293 |

PROCESS FOR THE PRODUCTION OF SINTERED MATERIAL BASED ON α-ALUMINUM OXIDE, ESPECIALLY FOR ABRASIVES

BACKGROUND OF THE INVENTION

1. Field of the Invention

The invention relates to a process for the production of sintered material, especially abrasive grain, based on aluminum oxide made from aluminum hydroxide (gibbsite or hydrargillite) or aluminum oxide calcined at a lower temperature.

2. Background Art

α-Aluminum oxide (corundum), because of its great hardness, has been used for many decades as an abrasive. The standard process for the production of corundum suitable for grinding purposes composes in melting aluminum oxide (alumina) or raw materials containing aluminum oxide (bauxite) in an electric arc furnace and crushing and screening the solidified molten mass to the desired abrasive grain size. Both melting and size reduction use a lot of energy because of the high melting point and great hardness, and require units that are expensive to acquire and maintain. Moreover, the properties of the abrasive grains thus obtained, especially their toughness, are not optimal for many uses.

Therefore, efforts were already undertaken early to obtain corundum abrasive grains by heating compounds containing aluminum below the melting point of corundum (approximately 2050° C.). However, in this connection, it turned out that it was not only important that the material to be sintered be dense and nonporous, but that a decisive role be played above all by the microstructure of the sintered material. It is especially important that a uniformly fine texture with crystallite sizes of $\leq 1$ μm result without including some coarse crystals.

The known solutions achieve this aim by the so-called sol-gel process by using highly pure boehmite (aluminum oxide-monohydrate, AlOOH) as the initial material (European Published Patent Application No. 24099) and optionally adding crystallization seeds which prevent the formation of large crystallites, by making possible a quick, complete crystallization in the desired modification, so that at a lower temperature there is neither time nor space for excessive growth of the individual crystallites (European Published Patent Application No. 152768). The thus-obtained products actually are qualitatively of very high grade, but relatively expensive, since the initial material is produced by hydrolysis of aluminum alkoxides which, on their part, are quite expensive.

The necessary low content of alkali metals, especially sodium, however, can hardly be achieved in any other way. A low sodium content is especially important to avoid the formation of β-aluminum oxide during heating. The latter has an especially disadvantageous effect on the abrasive properties because it is formed as coarse crystals. It was also attempted to obtain abrasives of comparable quality starting from less high grade boehmite, which, however, was attained only by the addition of considerable amounts (atom ratio to aluminum 1:35 to 1:2) of sintering auxiliary agents and adhering to a specific rate of heating (West German Patent No. 3,219,607). However, by these additions, additional solid phases are formed, for example, the spinels already described in above-mentioned European Published Patent Application No. 24099, which are undesirable because they make the abrasive grain "softer".

BROAD DESCRIPTION OF THE INVENTION

The main object of the invention is to provide a process for the production of a sintered aluminum oxide abrasive that starts from reasonably priced raw materials and yields in a simple way, without special additions, a product with great grinding performance. Other objects and advantages of the invention are set out herein or obvious herefrom to one skilled in the art.

The objects and advantages of the invention are achieved by the process of the invention.

The invention involves a process for the production of sintered materials based on α-aluminum oxide. A suspension of a precursor of α-aluminum oxide and optionally usual additives, is prepared. Aluminum hydroxide [Al(OH)$_3$] or an aluminum oxide calcined at a lower temperature is used as the precursor of α-aluminum oxide and is subjected to grinding and deagglomeration treatment for the formation of the suspension. The process continues by drying the suspension and sintering the dried material.

Preferably the grinding and deagglomeration treatment are performed with an attrition mill, a vibratory mill or a stirred ball mill. Preferably the attrition mill, vibratory mill or stirred ball mill is operated with grinding media consisting mainly of α-aluminum oxide. Preferably crystallization seeds of α-aluminum oxide are added to the suspension to prevent the grain growth during sintering. Preferably the suspension is adjusted to a pH of less than 5 by adding an acid. Preferably the acid is nitric acid, hydrochloric acid, acetic acid, citric acid, formic acid or oxalic acid. Preferably the suspension is subjected to a vacuum treatment to remove dissolved and/or adsorbed gases. Preferably the sintering is performed at a temperature of 1100° to 1500° C. Preferably aluminum hydroxide resulting in the alumina production by the Bayer process is used as the aluminum hydroxide.

The invention also includes sintered material based on α-aluminum oxide and optionally additions of other oxides, carbides, nitrides, silicides or metals, obtained by the invention process.

The invention further includes the process of using the invention sintered material as abrasive grain.

DETAILED DESCRIPTION OF THE INVENTION

Surprisingly, it has been found that it is possible by a suitable combination of process steps to produce from ordinary industrial aluminum hydroxide [Al(OH)$_3$, gibbsite, also called hydrargillite] as it is yielded in the Bayer process, sintered α-aluminum oxide of great density and hardness with a crystallite size of less than 1 μm, for example, even less than 0.5 μm.

The production of α-aluminum oxide from industrial aluminum hydroxide is indeed generally known (it is a step in the industrial-scale production of aluminum), but the thus-obtained aluminum oxide usually has properties that are completely unsuitable for normal grinding purposes, namely, a great porosity and poor sintering properties. Sintering commences at temperatures so high, that it is connected with a strong crystal growth and finally actually yields a dense, but—because of the coarse texture—mechanically unsatisfactory product, which does not offer any significant advantages relative to usual corundum. The so-called tabular alumina, for example, is produced in a similar way which is distinguished by its large (several hundred μm) tabular crystals. Only for certain types of surface treatment, such as, polishing, in which it is less important for the material removal, are such aluminum oxides suitable (East German Patent Specification No. 76485).

The usual aluminum hydroxide is not suitable for the above-mentioned sol-gel process since it disperses poorly and cannot be gelled [on the properties of the aluminum hydroxides see, e.g., *Ullmann's Encyclopedia of Industrial Chemistry*, Volume A1, VCH Verlagsgesellschaft mbH, Weinheim, (1985), pages 557 to 594.]

According to the invention the initial material is first subjected to wet grinding or deagglomeration to divide the agglomerates, present as a result of the production process, into individual crystallites. The deagglomeration is preferably performed in an attrition mill, a vibratory mill or a stirred ball mill—wherein grinding media are preferably used which consist entirely or predominantly of aluminum oxide. The amount of liquid is preferably selected so that a suspension results with a solids content of 10 to 40 percent by weight. Water is preferably used as the liquid, but it is also possible to replace the water partly with water-miscible and easily vaporizable solvents, such as, lower alcohols or acetone.

Thus, the obtained suspension is advantageously adjusted by acid addition to a pH of less than 5, by which dissolved or adsorbed carbon dioxide is expelled. Preferably it is adjusted to a pH of about 2 to 4. The acid suitably is nitric acid, hydrochloric acid, citric acid, formic acid, acetic acid or oxalic acid, preferably hydrochloric acid. The necessary acid amount in this case depends on the properties of the aluminum hydroxide, above all, on its specific surface. An acid addition can be completely or partially dispensed with by instead using a vacuum treatment of the suspension for degassing.

Suitably crystallization seeds are added to the aluminum hydroxide suspension, preferably those from α-aluminum oxide. These seeds can be obtained, for example, simply by grinding of α-aluminum oxide, for example, in the form of calcined alumina, to a particle size of $<1$ μm. Preferably the seeds are added in an amount of 1 to 5 percent by weight, relative to the total amount (calculated as $Al_2O_3$), and thoroughly mixed in. An addition at the beginning or during the deagglomeration is especially preferred. In addition to the crystallization seeds, optionally auxiliary or addition substances, such as, defoamers, sintering auxiliary agents, grain growth inhibitors, etc., can also be added. However, such addition substances are not necessary for the process according to the invention.

The suspension thus obtained is subsequently dried. The drying is suitably performed below the boiling point temperature to prevent the formation of vapor bubbles. At standard pressure, a drying temperature of about 70° C. is advantageous. If the suspension is present, for example, in a layer thickness of about 10 cm, the drying can be performed at this temperature in about 2 to 3 days. With the application of higher pressures the drying temperature can be increased corresponding to the higher boiling point and the drying time is shortened. The volume or the layer thickness corresponding to the decreasing liquid content is reduced during the drying without a significant porosity resulting. An open porosity of $\leq 0.05$ ml/g and an average pore diameter of $\leq 10$ nm (determined according to the mercury-penetration method) can be achieved.

The thus-obtained dried cake is subsequently sintered, optionally after grinding to the grain size corresponding to the desired abrasive grain size (taking into consideration the shrinking during sintering). The sintering temperature is suitably at 1100 to 1500° C. The sintering time depends on the temperature and is, for example, about 2 hours at 1400° C.

Despite the strong volume contraction (about 30 percent linear shrinking), a dense sintered product is obtained with the process according to the invention by the conversion of aluminum hydroxide into α-aluminum oxide without a separate calcination step being required. Instead of aluminum hydroxide, an at a lower temperature calcined aluminum oxide or mixtures of the latter and aluminum hydroxide can also be used for the process according to the invention. The aluminum oxides calcined at a lower temperature still contain some water, for example, about 8 percent by weight, and are again converted into aluminum hydroxide by water absorption with the treatment according to the invention, as shown by thermogravimetric examination of the dried suspension. Since the aluminum oxides calcined at a lower temperature are produced, on their part, from aluminum hydroxide and use thereof in the invention offers no special advantages, aluminum hydroxide is to be preferred as the initial material for the process according to the invention.

The sintered material produced according to the invention is distinguished by a very fine crystallite size, high sintered density and great hardness. Its toughness is in the area of 2.5 MPa·m$^{\frac{1}{2}}$ or greater. It is suitable not only as an abrasive, but also for other uses in which these characteristics are important.

The following examples illustrate the performance of the process according to the invention.

EXAMPLE 1

In an attrition mill (0.6 liter), 100 g of pure aluminum hydroxide (Martinal® OL-104, Martinswerk GmbH, D-W-5010 Bergheim) was ground for 2 hours in desalinated water with the addition of 1.5 percent by weight (relative to the aluminum hydroxide) of α-aluminum oxide seeds with aluminum oxide-grinding balls (d=1 mm) and deagglomerated. The particle or agglomerate size before the grinding was 100 percent smaller than 10 μm, after the grinding it was 100 percent smaller than 1 μm. The α-aluminum oxide seeds were obtained by grinding of high temperature calcined aluminum oxide in the attrition mill to a particle size of $<0.5$ μm. The pH was adjusted to 2 by addition of about 20 ml of 37 percent hydrochloric acid before the grinding. The suspension was dried for 2 days in a initial layer thickness of 5 cm at 70° C. The average pore diameter after drying was 9.5 nm (mercury-porosimetry), and the open porosity was less than 0.05 ml/g. An examination of the dried material with thermogravimetry or differential thermal analysis showed that the bound water escapes below 50° C. and the crystallization to α-$Al_2O_3$ set in at 1010° C. After 2 hours of sintering at 1400° C., a material with a crystallite size of $<0.5$ μm, a density of $>3.8$ g/ml ($>95$ percent th.D.) and a hardness according to Vickers (500 g load)$>19$ GPa, was obtained.

EXAMPLE 2

The process was performed as described in Example 1, however, instead of aluminum hydroxide, 70 g of an aluminum oxide (type HLS, Martinswerk) calcined at a lower temperature was used (loss on ignition about 5 percent by weight; Na$_2$O, about 0.2 percent by weight; other metals, 0.05 percent by weight; particle size, 99 percent <1 μm; specific surface, 200 m$^2$/g). A thermogravimetric examination of the dried material yielded a weight loss of 35 percent at 400° C., corresponding to the composition Al(OH)$_3$. After 2 hours of sintering at 1400° C., a product with the same properties as in Example 1 was obtained.

EXAMPLE 3

The process was performed as described in Example 2, however, with aluminum oxide of type AX (Martinswerk) calcined at a lower temperature (loss on ignition about 6 percent by weight; Na$_2$O, about 0.2 g by weight; other metals, 0.06 percent by weight; grain size distribution, about 25 percent <106 μm, about 10 percent <45 μm; specific surface, about 175 m$^2$/g) as the initial material. The sodium content after sintering (1400° C., 1 hour) was 0.11 percent by weight. No β-Al$_2$O$_3$ was able to be detected in the sintered material by x-ray diffraction analysis (detection limit about 1 percent by weight).

EXAMPLE 4

Comparison example

The process was performed as described in Example 2, however, instead of the attrition mill treatment it was mixed for only 30 minutes with a colloid mill (Ultra Turrax ®, Janke and Kunkel). The cake obtained after three days of drying at 70° C. had an average pore diameter of 400 nm and an open porosity of 0 06 ml/g. A material with an open porosity of 0.11 ml/g was obtained by calcining at 1200° C. (5 hours).

The material according to Example 2, on the other hand, only had an open porosity of 0.03 ml/g after 5 hours at 1200° C.

What is claimed is:

1. A process for the production of sintered materials based on α-aluminum oxide, comprising subjecting aluminum hyroxide [Al(OH)$_3$] or an aluminum oxide which has ben calcined at a lower temperature, either being a precursor of α-aluminum oxide, to grinding and deagglomeration treatment, producing a suspension from the precursor of α-aluminum oxide and optionally additives, drying the suspension, and sintering the dried suspension.

2. The process according to claim 1 wherein the grinding and deagglomeration treatment are performed with an attrition mill, a vibratory mill or a stirred ball mill.

3. The process according to claim 2 wherein the attrition mill, vibratory mill or stirred ball mill is operated with grinding media consisting mainly of α-aluminum oxide.

4. The process according to claim 3 wherein crystallization seeds of α-aluminum oxide are added to the suspension to prevent grain growth during sintering.

5. The process according to claim 4 wherein the suspension is adjusted to a pH of less than 5 by adding an acid.

6. The process according to claim 5 wherein the acid is selected from the group consisting of nitric acid, hydrochloric acid, acetic acid, citric acid, formic acid and oxalic acid.

7. The process according to claim 6 wherein the suspension is subjected to a vacuum treatment to remove dissolved and/or adsorbed gases.

8. The process according to claim 7 wherein the sintering is performed at a temperature of 1100° to 1500° C.

9. The process according to claim 8 wherein aluminum hydroxide resulting in the alumina production by the Bayer process is used as the aluminum hydroxide.

10. The process according to claim 1 wherein 1 to 5 weight percent, relative to the total weight, calculated as Al$_2$O$_3$, of crystallization seeds of α-aluminum oxide are added to the suspension to prevent grain growth during sintering, the α-aluminum oxide crystallization seeds having a particle size of less than 1 μm.

11. The process according to claim 1 wherein the suspension is adjusted to a pH of less than 5 by adding an acid.

12. The process according to claim 11 wherein the acid is selected from the group consisting of nitric acid, hydrochloric acid, acetic acid, citric acid, formic acid and oxalic acid.

13. The process according to claim 1 wherein the suspension is subjected to a vacuum treatment to remove dissolved and/or adsorbed gases.

14. The process according to claim 1 wherein the sintering is performed at a temperature of 1100° to 1500° C.

15. The process according to claim 1 wherein aluminum hydroxide resulting in the alumina production by the Bayer process is used as the aluminum hydroxide.

16. A sintered material based on α-aluminum oxide and optionally at least one member selected from the group consisting of carbides, nitrides, and silicides, obtained by the process according to claim 1.

17. A process for the production of sintered materials based on α-aluminum oxide, comprising subjecting aluminum hydroxide [Al(OH)$_3$] or an aluminum oxide which has been calcined at a lower temperature, either being a precursor of α-aluminum oxide, to grinding and deagglomeration treatment, producing a suspension from the precursor of α-aluminum oxide and optionally additives, adding crystallization seeds of α-aluminum oxide, to prevent grain growth during sintering, drying the suspension, and sintering the dried suspension.

18. A process for the production of sintered materials based on α-aluminum oxide, consisting of subjecting aluminum hydroxide [Al(OH)$_3$] or an aluminum oxide which has been calcined at a lower temperature, either being a precursor of α-aluminum oxide, to grinding and deagglomeration treatment, producing a suspension from the precursor of α-aluminum oxide and optionally at least one additive from the group consisting of defoamers, sintering auxiliary agents and grain growth inhibitors, obtained by the invention process, adding crystallization seeds of α-aluminum oxide to prevent grain growth during sintering, drying the suspension, and sintering the dried suspension.

19. A process for the production of sintered materials based on α-aluminum oxide, consisting of subjecting aluminum hydroxide [Al(OH)$_3$]]or an aluminum oxide which has been calcined at a lower temperature, either being a precursor of α-aluminum oxide, to grinding and deagglomeration treatment, producing a suspension from the precursor of α-aluminum oxide and optionally at least one additive from the group consisting of defoamers, sintering auxiliary agents and grain growth inhibitors, obtained by the invention process, adding crystallization seeds of α-aluminum oxide to the suspension to prevent grain growth during sintering, drying the suspension, adjusting the suspension to a pH of less than 5 by adding an acid, and sintering the dried suspension at a temperature of 1100° to 1500° C.

* * * * *

UNITED STATES PATENT AND TRADEMARK OFFICE
CERTIFICATE OF CORRECTION

PATENT NO. : 5,236,471
DATED : Aug. 17, 1993
INVENTOR(S) : Van Dijen It is certified that error appears in the above-identified patent and that said Letters Patent is hereby corrected as shown below:

On the Title page, item [73] Assignee: Lonza Ltd., Gampel/Valais, Switzerland

Signed and Sealed this

Twenty-ninth Day of March, 1994

Attest:

BRUCE LEHMAN

Attesting Officer         Commissioner of Patents and Trademarks